Oct. 12, 1948.  A. H. DAVIS, JR  2,451,154

LIQUID MEASURING DEVICE

Filed Nov. 21, 1945

INVENTOR.
ARCHIBALD H. DAVIS JR.
BY
W. H. Sullivan
ATTORNEY

Patented Oct. 12, 1948

2,451,154

UNITED STATES PATENT OFFICE 2,451,154

LIQUID MEASURING DEVICE

Archibald H. Davis, Jr., University Heights, Ohio, assignor to The Apex Electrical Manufacturing Co., Cleveland, Ohio, a corporation of Ohio Application November 21, 1945, Serial No. 630,023

8 Claims. (Cl. 137—139)

This invention relates to liquid measuring devices, and more particularly to a device of this type adapted to automatically terminate flow through a liquid supply line when a predetermined volume of liquid has been supplied.

It is a primary object of my invention to provide a device for supplying a predetermined volume of liquid from a supply line.

Another object of the invention is to provide a device for automatically terminating flow through a supply line when a predetermined quantity of liquid has been discharged.

Another object of the invention is to provide a device of the above type which is substantially unaffected by variation in pressure of the supply line.

Another object of the invention is to provide a device of the above type which is particularly adaptable to washing machines including automatically controlled washing machines wherein liquid is supplied several times during a complete cycle of operations.

Another object of the invention is to provide a device of the above type which comprises relatively few parts, is relatively economical to manufacture, and which can be easily installed.

Figure 1:
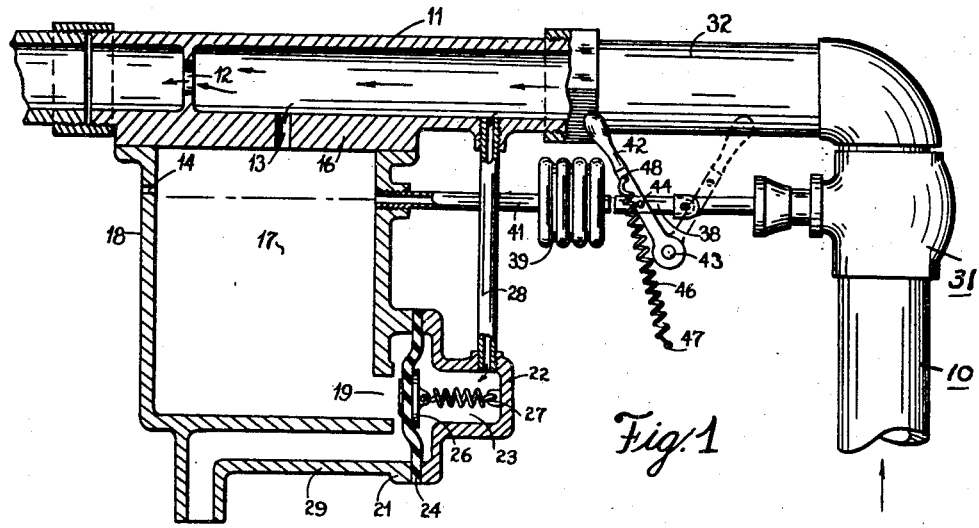
Figure 4:
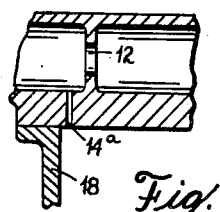
Figure 2:
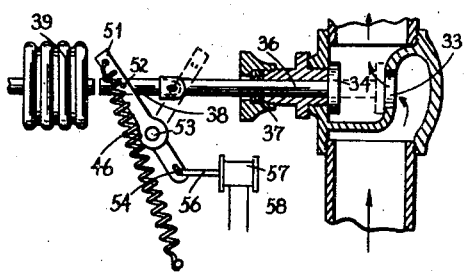
Figure 3:
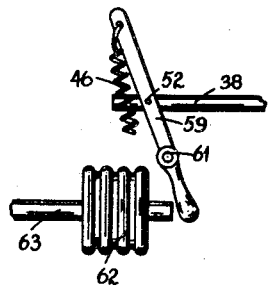

Other objects of the invention and the invention itself will become increasingly apparent from a consideration of the following description and drawings wherein:

Figure 1 is a view, partially in vertical section, of a device embodying my invention, Figure 2 is an enlarged sectional view of the valve illustrated in Fig. 1 with a solenoid control for opening the valve, Figure 3 is a fragmentary view showing a bellows type control for opening the valve, and Figure 4 is a fragmentary sectional view showing a modified form of air vent.

I am aware that it has been previously proposed to shut off the liquid supply to a washing machine or the like by a float controlled valve, but if the liquid in which the float operates is agitated the control is erratic. Further, unless supplemental over-control means for the float are provided, the valve will open when draining occurs. I have provided a device overcoming the above-mentioned disadvantages.

According to the invention, a restriction or orifice is disposed axially in the supply line and an adjacent relatively smaller opening at the upstream side of the orifice directs liquid into a measuring chamber so that the amount of liquid in the chamber has a fixed relation to a larger amount of liquid which passes through the orifice and is discharged. This relationship is independent of pressure or rate of flow, because both openings are orifices and the effect of pressure changes on the volume of fluid passed is the same for both openings. When the measuring chamber is filled with liquid under a pressure corresponding to that at the upstream side of the orifice, a pressure responsive device is operated to move the supply valve in a closing direction. While the chamber is filling, air in the chamber escapes through 14a. When the chamber is full, water tries to go through opening 14a. However, the resistance to flow of water is greater than that for the same velocity of air. Consequently, the pressure in chamber 17 increases, not to full line pressure, but to half line pressure if, for example, openings 13 and 14a are equal in size. Supplemental means are provided which automatically effect closing of the valve upon a predetermined movement of the pressure responsive device to avoid a throttling action of the valve. An arrangement is provided for automatically draining the measuring chamber for re-use when the supply valve is closed. The supplemental means may be operated either manually or automatically under the control of a timer to open the valve.

Referring now to the drawings and particularly Fig. 1, I have indicated at 10 a liquid supply line such as a conventional water supply line for domestic use having a line pressure such as 30 pounds per square inch. The measuring device comprises a conduit 11 connected to the supply line 10 at one end and at its opposite end the conduit may be connected to a pipe discharging into a washing machine or the like. Conduit 11 has an axial restriction or orifice 12 therein and a lateral opening 13, the opening 13 being at the upstream side of the orifice. Conduit 11 may be formed integral with a cover 16 for a measuring chamber generally indicated at 17.

Chamber 17 may comprise a generally cylindrical housing 18 having a lower drain port 19 encircled by a boss 21 which cooperates with a cup member 22 to mount a diaphragm valve 23. Valve 23 may comprise a flexible rubber diaphragm 24 sealingly gripped between boss 21 and member 22, the diaphragm having a stiffening plate 26 clamped thereto. A tension spring 27 interconnects plate 26 and the base of the cup member 22 and normally tends to maintain the valve 23 out of contact with drain port 19. A relatively small diameter pipe 28 connects conduit 11 and cup member 22 whereby liquid pressure in conduit 11 may be continuously transmitted to the side of diaphragm 24 remote from port 19. The base of housing 18 is formed to provide a drain passage 29 for directing liquid passing from port 19 to a suitable drain.

A valve 31 inserted between line 10 and a line 32 connected to conduit 11 controls the volume of liquid discharged through the conduit. As best illustrated in Fig. 2, valve 31 has a port 33 therein which cooperates with a valve element having a closure 34 and a stem 36. The stem 36 is sealed in a conventional manner as indicated at 37. Pivotally connected to stem 36 is an arm 38 adapted to be engaged by an expansible bellows 39 to effect closing of valve 31. A pipe 41 connects bellows 39 with housing 18 whereby the liquid pressure in chamber 17 may be communicated to the bellows.

The operation of the parts so far described will now be explained. Assuming that the chamber 17 is empty and the drain port 19 is uncovered, upon opening of valve 31 liquid will flow through conduit 11 and liquid pressure will be transmitted through pipe 28 to diaphragm valve 23 which will be immediately moved to close drain port 19. A portion of the liquid will be discharged through orifice 12 and a smaller portion will pass into chamber 17 through opening 13 in accordance with the relative cross-sectional areas of orifice 12 and opening 13. Opening 14 in chamber 17 acts as an air vent permitting air trapped above the liquid level in chamber 17 to be discharged to atmosphere. The air vent may be formed in conduit 11 as indicated at 14a, Fig. 4, and in this construction the air is discharged with the liquid passing through orifice 12. When the chamber 17 becomes filled with liquid, the pressure therein is transmitted through pipe 41 to bellows 39 thereby expanding the bellows and bringing it into contact with arm 38 to move the arm in a valve closing direction. Inasmuch as closing movement of valve 31 reduces the pressure in conduit 11 and resultantly in bellows 39 which would tend to effect a throttling action of valve 31, I provide an over center arrangement for positively closing valve 31 when bellows 39 has expanded a predetermined amount.

A handle 42 (Fig. 1) is pivotally mounted at 43 and is pivotally connected to arm 38 as indicated at 44. A tension spring 46 has one end fixed at a point 47 substantially in vertical alignment with pivot 43 and its opposite end is connected to handle 42 at a point 48 beyond connection 44. It will now be understood that when bellows 39 moves arm 38 to the right so that point 48 moves beyond a vertical line passing through point 47 that the tension of spring 46 will close valve 31 and maintain the valve closed regardless of pressure drop in chamber 17. Upon closing of valve 31 the pressure in conduit 11 and chamber 17 will equalize and permit spring 27 to pull the diaphragm valve 23 away from port 19 and effect draining of the chamber. When it is again desired to effect liquid discharge, handle 42 is manually rocked in a counter-clockwise direction to the position illustrated in Fig. 1 which moves valve 31 to the open position.

The amount of liquid discharged is dependent upon the relative cross-sectional areas of orifice 12 and opening 13 and the capacity of chamber 17 but is substantially independent of pressure in conduit 11 or pressure variation in the supply line. Thus, if it is desired to accurately control the amount of water discharged to a washing machine or the like, it is only necessary to open the valve 31 as described and it will be automatically closed when a predetermined volume of liquid has been discharged.

In the case of automatically controlled washing machines or the like, it is common practice to supply a given amount of water for initial washing and recirculate the water by a pump, then spin the clothes container for partial drying, then subsequently supply a like amount of water one or more times for rinsing and for recirculation, and finally spin the container for partial drying prior to removal of the clothes. The various operations are effected automatically as by an electric timer which will periodically actuate solenoids or by a hydraulic system wherein a master valve periodically supplies liquid under pressure to Sylphon bellows. The apparatus to be described is particularly adaptable to automatically controlled machines of this type.

Referring now to Fig. 2, an arm or handle 51 is substituted for the handle 42 of Fig. 1 and is pin connected to arm 38 as indicated at 52. Arm 51 is pivotally mounted as indicated at 53 and is provided with a slot 54 at its lower end to receive the hooked end of a rod 56 connected to the core of a solenoid 57, the solenoid leads 58 extending to a timer (not shown) which will periodically energize the solenoid thereby rocking arm 51 in a counter-clockwise direction to open valve 31.

Referring to Fig. 3, I have shown an arrangement generally similar to that illustrated in Fig. 2, but wherein the valve 31 is opened by a bellows rather than a solenoid. An arm 59 is pivotally mounted as indicated at 61 and its lower end is adapted to be engaged by a bellows 62 to rock arm 59 in a counter-clockwise direction to open the valve 31. As previously explained, bellows 62 will communicate with a master control valve through a line 63 whereby fluid under pressure will be communicated to the bellows periodically when it is desired to open the valve. It is only necessary to momentarily energize solenoid 57 or apply pressure to bellows 62 since the over center spring 46 holds the valve in open position until again closed by expansion of bellows 39 as previously described.

Although I have shown and described preferred forms of my invention, I contemplate that numerous and extensive departures may be made therefrom without departing from the spirit of the invention and the scope of the appended claims.

What I claim is:

1. The combination with a conduit adapted to transmit liquid under pressure, of a measuring chamber, the conduit having a restricted orifice therein, passage means between the conduit and chamber at the upstream side of the orifice having a cross-sectional area substantially less than the cross-sectional area of the orifice, a valve controlling liquid flow through the conduit disposed at the upstream side of the passage means, the valve being arranged so that liquid pressure in the conduit tends to open the valve, liquid pressure responsive means communicating with the chamber and adapted to move the valve towards closing position when the chamber is filled with liquid, and supplemental means automatically operative upon a predetermined movement of the pressure responsive means in a given direction to close the valve and maintain the valve closed despite movement of the pressure responsive means in a reverse direction.

2. The combination with a conduit adapted to transmit liquid under pressure, of a measuring chamber, the conduit having a restricted orifice therein, passage means between the conduit and chamber at the upstream side of the orifice having a cross-sectional area substantially less than the cross-sectional area of the orifice, a valve controlling liquid flow through the conduit disposed at the upstream side of the passage means, pressure responsive means communicating with the chamber and adapted to move the valve towards closing position when the chamber is filled with liquid, supplemental means automatically operative upon a predetermined movement of the pressure responsive means in a given direction to close the valve and maintain the valve closed despite movement of the pressure responsive means in a reverse direction, a drain valve in the lower portion of the chamber adapted to be closed by liquid pressure in the conduit when the control valve is opened, and means for automatically opening the drain valve when liquid pressure in the conduit and chamber is equalized by closing the control valve.

3. The combination as set forth in claim 1 and wherein the supplemental means is adapted to be manually actuated to open the control valve.

4. The combination of a conduit adapted to transmit liquid under pressure and having a restricted orifice therein, a measuring chamber associated with the conduit, the conduit having an opening therein communicating with the chamber at the upstream side of the orifice, and of a cross-sectional area substantially less than the cross-sectional area of the orifice whereby the amount of water discharged and the amount passing to the chamber will be proportional to said areas, a valve controlling liquid flow through said conduit disposed at the upstream side of said opening, pressure responsive means in communication with the chamber adapted to move the control valve towards closing position when the chamber is filled with liquid, supplemental over center means adapted to close the control valve upon a predetermined movement of the pressure responsive means, a drain valve in the lower portion of the chamber comprising a port and a diaphragm, means communicating liquid pressure in the conduit to one side of the diaphragm whereby when the control valve is open the drain valve is closed, and spring means adapted to move the diaphragm away from the port when pressure in the chamber and conduit is equalized by closing the control valve.

5. A unit adapted to be associated with a liquid supply line for automatically limiting discharge of liquid to a predetermined volume despite variation in line pressure, said unit comprising a generally cup shaped closed housing forming a measuring chamber, a conduit mounted on the housing cover having an axially disposed reduced orifice therein, a valve adapted to be connected to the supply line and control liquid flow through the conduit, a cover having a passage therethrough communicating with the conduit at the upstream side of the orifice and of substantially less cross-sectional area than the orifice, the valve having a reciprocable stem portion, an expansible bellows communicating with the housing and adapted to move the stem in a valve closing direction when the chamber is filled with liquid and subjected to pressure at the upstream side of the orifice, a lever pivotally connected to the stem and mounted for rocking movement, over center spring means fixed to the lever whereby when the stem is moved a predetermined distance by the bellows in a valve closing direction the spring means effects closing of the valve, and the lever being adapted to be rocked in a reverse direction to open the valve.

6. The combination as described in claim 5 and wherein the housing is provided with a drain port in the lower portion thereof, a diaphragm valve adapted to close the port, a chamber at the side of the diaphragm remote from the port, and communicating means between the upstream side of the orifice and the chamber whereby upon opening of the control valve the diaphragm valve will be moved to close the port by liquid pressure.

7. The combination with a conduit adapted to transmit liquid under pressure, of a measuring chamber, a conduit having a restricted orifice therein, passage means between the conduit and chamber at the upstream side of the orifice having a cross-sectional area substantially less than the cross-sectional area of the orifice, a valve controlling liquid flow through the conduit disposed at the upstream side of the passage means, the valve being arranged so that liquid pressure in the conduit tends to open the valve, liquid pressure responsive means communicating with the chamber and adapted to move the valve towards closing position when the chamber is filled with liquid, supplemental means automatically operative upon a predetermined movement of the pressure responsive means in a given direction to close the valve and maintain the valve closed despite movement of the pressure responsive means in a reverse direction, and timer responsive means for automatically actuating the supplemental means to open the control valve.

8. The combination with a conduit adapted to transmit liquid under pressure, of a measuring chamber, a conduit having a restricted orifice therein, passage means between the conduit and chamber at the upstream side of the orifice having a cross-sectional area substantially less than the cross-sectional area of the orifice, a valve controlling liquid flow through the conduit disposed at the upstream side of the passage means, the valve being arranged so that liquid pressure in the conduit tends to open the valve, liquid pressure responsive means communicating with the chamber and adapted to move the valve towards closing position when the chamber is filled with liquid, supplemental means automatically operative upon a predetermined movement of the pressure responsive means in a given direction to close the valve and maintain the valve closed despite movement of the pressure responsive means in a reverse direction, the chamber having an air vent disposed at the downstream side of the orifice effecting communication between the chamber and conduit, and the vent having a smaller cross-sectional area than said passage means whereby actuation of the pressure responsive means towards control valve closing position will be effected before there is any appreciable discharge of liquid through the air vent.

ARCHIBALD H. DAVIS, Jr.

REFERENCES CITED

The following references are of record in the file of this patent:

UNITED STATES PATENTS

| Number | Name | Date |
|---|---|---|
| 640,497 | Staples | Jan. 2, 1900 |
| 1,297,563 | Hardy | Mar. 18, 1919 |
| 1,568,720 | Buelna | Jan. 5, 1926 |